United States Patent Office 2,735,931
Patented Feb. 21, 1956

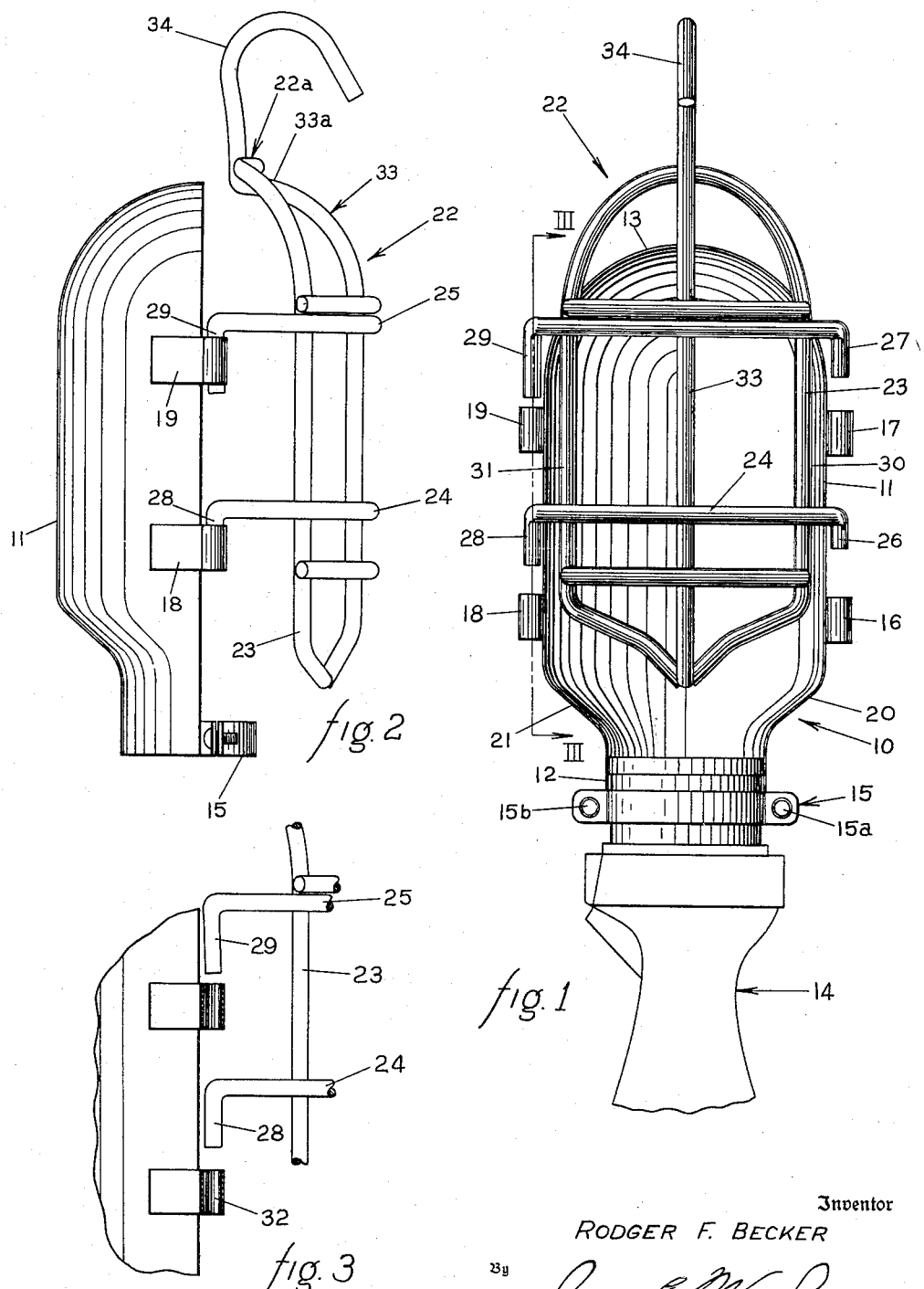

2,735,931

SEPARABLE SUSPENSION DEVICE FOR AN EXTENSION LAMP

Rodger F. Becker, Kalamazoo, Mich.

Original application December 6, 1949, Serial No. 131,398, now Patent No. 2,716,701, dated August 30, 1955. Divided and this application June 28, 1955, Serial No. 518,578

6 Claims. (Cl. 240—54)

This invention, which is a division of Serial No. 131,398, filed December 6, 1949, now Patent No. 2,719,701, relates in general to an extension lamp having suspension means, such as a hook, separably secured thereto, and more particularly to a device for effecting such separation without damaging the parts thereof, when forces urging said lamp and hook apart are imposed thereon.

Extension lamps commonly used in mechanical work and related fields are generally provided with a suspension device, such as a hook, whereby the workman can suspend the lamp on any convenient support and thereby have both hands free.

However, certain hazards are associated with such devices. An example that occurs in the automotive repair field arises when a forgetful mechanic moves a car with an extension lamp still hooked onto the bumper. The extension cord often breaks and leaves a live wire free to cause injury. Or, in any event, even if no injury is caused by the live wire, it will require extensive repairs. Similar damage may arise when a workman trips over the extension cord or a passing object catches the extension cord.

Until the time of this invention, no device has to my knowledge been devised which would serve the functions of a suspendible extension lamp yet would eliminate this hazardous feature accompanying the use of such a lamp.

This invention contemplates an extension lamp having a suspension device, such as a hook, detachably secured thereto. The suspension device is so attached to the lamp that under ordinary handling it is held securely in place, but when a sudden force is applied to the extension cord, the suspension device will be automatically detached from the remainder of the lamp. Thus, when my lamp is hung upon a movable object, such as an auto bumper, there is no danger that the extension cord will be broken, for any sudden jerk or pull upon the cord will effect a disengagement between the suspension device and the rest of the lamp. The resulting fall may break the lamp bulb, but the lamp itself will not be damaged by the separation.

Accordingly, a primary object of this invention is the provision of an extension lamp, having a detachable means from which the lamp may be suspended, which will prevent breaking of the extension cord when any sudden force is applied to the suspension means while the lamp is in use.

A further object of this invention is the provision of a suspendible extension lamp having a detachable suspension device which will not be disengaged from the lamp during ordinary handling.

A further object of the invention is the provision of means for detachably securing a suspension device to an extension lamp, whereby said suspension device can be easily and quickly re-attached to said lamp after a separation has occurred.

Another object of the invention is the provision of means for detachably securing a suspension device to an extension lamp, as aforesaid, which will separate by application of forces which do not exceed the tensile limits of the extension cord.

A further object of the invention is to provide a device as above stated wherein the bulb is readily replaceable.

Other objects and purposes of this invention will become apparent to persons familiar with this type of equipment upon referring to the accompanying drawings and upon reading the following specification.

For illustration of my invention, reference is made to the accompanying drawing in which:

Figure 1 is a front elevation view of one embodiment of my invention with the guard, to which the suspension device is secured, detached from the remainder of the lamp.

Figure 2 is a side elevation view of the embodiment shown in Figure 1.

Figure 3 is a fragmentary, sectional view taken on the line III—III of Figure 1.

Construction

For convenience and without intending any limitation the end of the lamp, or parts associated therewith, appearing toward the top of the sheet in Figure 1 may hereinafter be termed "upper end" and the other end of the lamp, or parts associated therewith, may hereinafter be termed "lower end."

The extension lamp 10, Figures 1, 2 and 3, consists of a semi-cylindrical, reflective shell 11, having a reduced circumference at its lower open end 12 and having a gradually reducing circumference at its upper closed end 13.

The lower end 12 of the shell 11 is secured to a handle 14, of a conventional type extension lamp, having a switch, a plug socket, and light socket therein, by conventional means, such as the semi-circular gripping bracket 15, which is secured to said shell by the screws 15a and 15b.

Two hollow, preferably cylindrical, co-axial support brackets 16 and 17 are secured to the outer edge 20 of the shell 11. A similar pair of brackets 18 and 19 are similarly secured to the outer edge 21 of the shell 11.

A semi-cylindrical, wire mesh guard 22, Figures 1 and 2, consisting of a substantially rectangular wire support base 23 with at least two parallel, spaced, semi-circular, transverse wires 24 and 25 secured to said base, as by welding, is detachably secured to the shell 11 by means of connector pins 26, 27, 28 and 29 which are respectively engaged by the support brackets 16, 17, 18 and 19.

The pins 26 and 28, Figure 1, are formed by bending the ends of transverse wire 24 toward the lower end of the lamp so that said pins 26 and 28 are perpendicular to the plane of the wire 24, are parallel to each other and have their axes spaced apart a distance equal to the spacing of the axes of the hollow brackets 16 and 18. The pins 27 and 29, Figures 1 and 2, are similarly formed on the ends of the wire 25 and are spaced for engagement with the brackets 17 and 19.

However, the pin 29 is bent through slightly more than 90 degrees so that it forms a slightly acute angle with the plane defined by the wire 25 and, therefore, is not quite parallel with the pin 27. The purpose of this arrangement is explained hereinafter.

The connector pins 26, 27, 28 and 29 are of a diameter slightly less than the inside diameter 32, Figure 3, of the support brackets 16, 17, 18 and 19 so as to facilitate entry of the pins into the brackets. The pins are also of different lengths with respect to each other ranging, respectively, from the shortest pin 26 to the longest pin 29 so as to permit successive insertion of each pin into its respective support bracket.

A longitudinal wire 33 is secured to the wires 24 and 25, as by welding, substantially at equal distances from the sides 30 and 31 of the wire support base 23 and curves at 33a to engage and extend beyond the upper end 22a of said wire support base 23. The extended end of the wire 33 may be formed into a suitable suspension device such as the hook 34.

*Operation*

In operation the reflective shell 11, Figure 1, is secured to the handle 14, by means of the bracket 15 and the screws 15a and 15b. The guard 22, Figures 1, 2 and 3, is detachably secured to the shell 11 by successively and partially inserting each of said pins into its respective support bracket beginning with the longest pin 29 and progressing through pins 28 and 27, in that order, to the shortest pin 26. When all the pins are thus partially inserted, the guard may then be forced downwardly toward the handle 14 and the pins will enter the hollow brackets to their respective full lengths.

As previously stated, the pin 29, Figures 1, 2 and 3, which is the longest pin and the first to be partially inserted, is bent slightly more than the remaining pins so that it is disposed at an angle to the plane of the other pins. Upon partial insertion of the pin 29 in its support bracket 19, the guard 22 will tilt slightly so that the remaining pins are no longer exactly co-axial with the inside openings in their respective support brackets. Thus to insert the remaining pins, it is necessary to exert a slight bending force upon the guard 22 in order to realign the pins 28, 27 and 26 with their respective support brackets 18, 17 and 16. Upon insertion of the remaining pins 28, 27 and 26, the re-aligning force is borne by the engagement between said pins and the inside surfaces of their respective support brackets 18, 17 and 16, thereby firmly securing the guard 22 upon the shell 11 so that it will not be disengaged during ordinary usage of the lamp.

To detach the guard 22 from the shell 11, it is only necessary to overcome the binding force exerted between the pins and the inside surfaces of their respective support brackets. This may be accomplished by applying a suitable force to the hook 34, which is secured to the upper end of the guard 22, in a direction away from the handle. Thus, when the lamp is suspended from the bumper of a car, for example, and the car is moved, the resultant force will disengage the guard 22 from the shell 11 before it will break extension cord.

It will be observed also that the separation means illustrated in Figures 1, 2 and 3 may also be utilized in effecting a quick change of the bulb.

Although the above mentioned drawings and description apply to a particular, preferred embodiment of my invention, it is not my intention, implied or otherwise, to eliminate other variations or modifications which lie within the scope of the invention unless specifically stated to the contrary in the hereinafter appended claims.

I claim:

1. In an extension lamp having a reflective shell and a guard having a suspension device thereon, detachable means for securing said guard to said shell comprising: a first pair of hollow, pin engaging brackets secured to opposite outer edges of said shell; a second pair of hollow, pin engaging brackets longitudinally spaced from said first pair of engaging brackets and similarly secured to said shell; a first pair of pins secured to said guard and disposed, respectively, to fit snugly, but slidably, within the hollow portion of said first pair of brackets; a second pair of pins secured to said guard and adapted, respectively, to fit snugly, but slidably, within the hollow portion of said second pair of brackets, one pin being slightly misaligned with its corresponding bracket, said suspension device extending in a direction opposite to the direction in which said pns extend, whereby a force exerted on said suspension device in a direction opposite to the direction in which said pins extend will urge said pins to move out of said brackets.

2. The structure of claim 1 wherein said one pin is receivable into its bracket before the other pins are received into their corresponding brackets when securing said guard upon said shell.

3. The device claimed in claim 1 wherein the free ends of said pins inserted into said brackets are irregularly spaced with respect to each other in a direction parallel with the axes of said pins and the entry ends of said brackets are regularly spaced with respect to each other in a direction parallel with the axes of said brackets.

4. In an extension lamp having a protective shell and a guard having a suspension device thereon, separable means for securing said guard to said shell comprising: three, elongated, pin-engaging brackets secured to the outer edges of said shell, at least one bracket being located upon each edge, said brackets having axially parallel, lengthwise openings therein; three pins arranged on said guard for concurrent, snug and slidable reception into said openings, one pin being slightly misaligned with its corresponding bracket, said suspension device extending in a direction opposite to the direction in which said pins extend, whereby a force exerted on said suspension device in a direction opposite to the direction in which said pins extend will urge said pins to move out of said brackets.

5. The structure of claim 4 wherein said one pin is receivable into its bracket before the other pins are received into their corresponding brackets when securing said guard upon said shell.

6. In an extension lamp having a reflective shell and a guard having a suspension device thereon, detachable means for securing said guard to said shell comprising: a first pair of elongated, hollow, pin-engaging brackets secured to opposite outer edges of said shell and having parallel axes; a second pair of elongated, hollow, pin-engaging brackets longitudinally spaced from, and axially parallel with, said first pair of brackets, respectively, and similarly secured to said shell, said second pair of brackets having parallel axes; a first pair of parallel pins of different axial lengths secured to said guard and laterally spaced a distance substantially equal to the lateral displacement of said first pair of brackets for snug, but slidable, reception therewithin; a second pair of pins of different axial lengths, both being longer than the said first pair of pins and secured to said guard, said second pins being laterally spaced from each other a distance substantially equal to the lateral displacement of said second pair of brackets, the shorter pin of said second pair of pins lying within the plane of said first pair, and the longer pin of said second pair being at one point within the said plane and disposed at a slight angle thereto, the corresponding pin of said first pair being longitudinally spaced further from said shorter pin than from said longer pin of the second pair; whereby said longer pin will bind with the walls of its respective bracket, when the pins are inserted into their corresponding brackets, said suspension device extending in a direction opposite to the direction in which said pins extend, whereby a force exerted on said suspension device in a direction opposite to the direction in which said pins extend will urge said pins to move out of said brackets.

References Cited in the file of this patent

UNITED STATES PATENTS

| | | |
|---|---|---|
| 2,172,223 | Ribble | Sept. 5, 1939 |
| 2,677,753 | Heinz | May 4, 1954 |